United States Patent [19]

Huang et al.

[11] 3,926,890

[45] Dec. 16, 1975

[54] PROCESS FOR PRODUCING CATIONIC SYNTHETIC LATEX INVOLVING EMULSION POLYMERIZATION OF HALOALKYL ESTERS OF ACRYLIC AND METHACRYLIC ACID FOLLOWED BY QUARTERNIZATION WITH TERTIARY AMINE

[75] Inventors: Ching Yun Huang, Minoo; Senzo Shimizu, Suita; Hiroyuki Adachi, Amagasaki, all of Japan

[73] Assignee: Mitsubhishi Gas Chemical company, Inc., Tokyo, Japan

[22] Filed: Dec. 4, 1972

[21] Appl. No.: 311,478

Related U.S. Application Data

[63] Continuation-in-part of Ser. No. 143,654, May 14, 1971, abandoned.

[52] U.S. Cl... 260/29.6 H; 260/29.7 H; 260/86.1 R; 260/29.6 TA; 260/80.7
[51] Int. Cl.² ............................................. C08F 22/18
[58] Field of Search.. 260/29.6 H, 29.6 HN, 29.6 N, 260/29.6 TA, 29.7 T, 85.7, 86.1 N, 85.7, 80.7, 86.1 R

[56] References Cited
UNITED STATES PATENTS

| | | | |
|---|---|---|---|
| 2,694,702 | 11/1954 | Jones | 260/29.6 |
| 2,795,567 | 6/1957 | Ruehrwein | 260/41 |
| 2,823,201 | 2/1958 | Wheaton | 260/29.6 |
| 2,914,513 | 11/1959 | Daniel | 260/85.7 |
| 3,050,506 | 8/1962 | Sexsmith | 260/85.7 |
| 3,418,301 | 12/1968 | Spivey | 260/86.7 |

FOREIGN PATENTS OR APPLICATIONS

| | | | |
|---|---|---|---|
| 2,125,047 | 12/1971 | Germany | 260/29.6 TA |

OTHER PUBLICATIONS

Chemical Abstracts Vol. 75 77946M.
Abstract of Japanese Pat. No. 71 18,141 May, 1971.
Faber & Fowler – Journal of Polymer Science – Part A1 Vol. 8, pps. 1774–1784 (1970).

*Primary Examiner*—Joseph L. Schoter
*Assistant Examiner*—Peter F. Kulkosky
*Attorney, Agent, or Firm*—Fitzpatrick, Cella, Harper & Scinto

[57] ABSTRACT

A process for preparing a latex excellent in adsorbtion to substrates such as pulp, paper and the like, wherein polymer particles which are dispersed in an aqueous medium retain cationic charges in themselves. The cationic synthetic latex is prepared by (1) copolymerizing by emulsion polymerization a haloalkyl ester of acrylic or methacrylic acid with the other monoethylenically unsaturated compound and/or a conjugated diene compound in the presence of a nonionic and/or cationic surface active agent, and (2) then reacting a basic nitrogen-containing compound with the copolymer thus obtained to form an ammonium salt thereof.

13 Claims, No Drawings

PROCESS FOR PRODUCING CATIONIC SYNTHETIC LATEX INVOLVING EMULSION POLYMERIZATION OF HALOALKYL ESTERS OF ACRYLIC AND METHACRYLIC ACID FOLLOWED BY QUARTERNIZATION WITH TERTIARY AMINE

This application is a continuation-in-part application of U.S. Ser. No. 143,654 filed on May 14, 1971, now abandoned.

The present invention relates to a process for producing a stable cationic synthetic latex wherein the copolymer particles having cationic charges in themselves are dispersed in a aqueous medium.

The present latex is excellent in adsorption to pulp, paper, fiber, textile fabrics, etc. It largely contributes, for example, to the improvements in strength of paper, processability of fiber treatment and efficiency of treated fibers accomplished thereby, and then is useful as a treating agent for fibrous materials. Further, the present latex is also useful as an additive in the production of synthetic paper and as a binder in the production of nonwoven fabrics of synthetic fiber. For example in particular, in the production of synthetic paper, the present latex may be used as an assisting agent with antielectrostatic agent in the plastic film method, and as an agent for reinforcing inter-fibrous bonding in the sheet-making method of plastic fiber.

U.S. Pat. No. 3,108,979 discloses an aqueous colloidal dispersion of polymers obtained by emulsion polymerization of salts of amino alcohol esters of $\alpha$-methylene carboxylic acids and other polymerizable monomers (the said dispersion lies in the category of cationic latex). The salt monomer used above is extremely soluble in water so that the copolymerization can hardly be effected to obtain an aqueous dispersion of the desired copolymer. In the aqueous dispersion obtained by said process, the dispersed particles are composed of a mixture of polymers consisting essentially of homopolymers of the salt monomer and of the other monomer, but only homopolymer of the salt monomer is localized on the surface of the particles. Accordingly, an aqueous dispersion of copolymer wherein the copolymer particles possess sufficient cationic charges in themselves cannot be obtained, thereby a latex obtained is not satisfactory in both mechanical and chemical stabilities.

British Patent No. 915,759 discloses the production of a cationically charged copolymer by copolymerizing a basic acrylic monomer such as diethylaminoethyl methacrylate with a neutral acrylic ester such as methyl methacrylate, and reacting the resulting copolymer with benzyl chloride or acetic acid. The thus obtained cationically charged copolymer, however, is water-soluble and is not adsorbed thereon at all when applied to pulp or the like.

It has also been proposed that, instead of basic nitrogen-containing monomers above-mentioned, a halogencontaining monomer, such as vinyl $\alpha$-haloester, is used for preparing the cationically charged copolymer. For instance, U.S. Pat. No. 2,914,513 discloses aqueous dispersible copolymeric compositions obtained by treating a copolymer, derived from vinyl esters, (e.g. vinylacetate) and vinyl $\alpha$-haloesters (e.g. vinyl $\alpha$-chloroacetate) with a tertiary amine to form quaternary salts. However, the copolymer having units derived from vinyl $\alpha$-haloesters is poor in resistance to chemicals such as an aqueous alkaline solution or hot water, and it can not always be used practically. Moreover, the vinyl $\alpha$-haloesters must be copolymerizable with the comonomeric vinyl ester. If alkyl esters of acrylic acids or conjugated diene compounds are used as co-monomer, copolymer of vinyl $\alpha$-haloesters with the acrylates or the conjugated diene compounds is hardly formable and not satisfactory yet in various properties.

The present invention provides a process for producing a cationic synthetic latex wherein the dispersed particles are composed of polymer units derived from haloalkyl esters of acrylic acids. In the process of the present invention there are no defects mentioned above in using the vinyl $\alpha$-haloesters.

According to the present invention, (1) one or more of haloalkyl esters of acrylic or methacrylic acid and (2) a mono-ethylenically unsaturated compound other than the said monomer and/or (3) a conjugated diene compound are copolymerized by emulsion polymerization in the presence of a nonionic surface active agent, a cationic surface active agent or a mixture thereof and a polymerization initiator. The resulting copolymer is treated with a basic nitrogen-containing compound to form an ammonium salt therewith. The ammonium salt in the thus obtained copolymer dissociates in an aqueous medium, whereby the copolymer particles come to possess cationic charges in themselves. Thus a stable cationic synthetic latex which is the object of the present invention is prepared. The cationic latex wherein quaternary ammonium salt is formed, is fairly stable even against the addition of inorganic compounds which impart mono-valent or poly-valent cationic and also anionic residual groups in aqueous media. Accordingly, the process for producing a cationic synthetic latex wherein the copolymer forms quaternary ammonium salt thereof is particularly useful.

The present haloalkyl esters of acrylic or methacrylic acid are at least one of those represented by the formula:

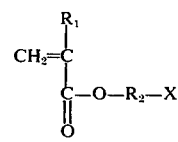

wherein $R_1$ represents a hydrogen atom or a methyl group; $R_2$ represents an alkylene group having from 1 to 12 carbon atoms; and X represents a chlorine, bromine or iodine atom.

Said haloalkyl esters or acrylic or methacrylic acid may include such as 2-chloroethyl acrylate, 2-chloroethyl methacrylate, 2-bromoethyl acrylate, 2-bromoethyl methacrylate, 2-iodoethyl acrylate, 12-chlorododecyl methacrylate, 2-chloro-iso-propyl methacrylate, 2-ethyl-6-bromohexyl acrylate or the like.

The said haloalkyl esters of acrylic or methacrylic acid is used in an amount of from 1 to 40 percent by weight, preferably from 3 to 20 percent by weight based on the total monomer.

The usable comonomer, for example, includes such mono-ethylenically unsaturated compounds as styrene, ring-substituted styrenes, alkyl acrylates, alkyl methacrylates, ethylene, vinyl chloride, vinylidene chloride or the like.

The conjugated diene compounds which are used as one of comonomers include isoprene, butadiene or the like.

These comonomers may be used alone or in the combination of the two or more.

Said haloalkyl esters of acrylic or methacrylic acid is relatively hydrophobic and may be copolymerized easily with other monomers by means of conventional emulsion polymerization techniques using emulsifiers. The emulsifier must essentially be used to disperse the relatively hydrophobic monomeric materials as well as a copolymer formed in an aqueous medium during the aqueous emulsion copolymerization of the monomeric composition as mentioned above. The emulsifiers used in the present invention include cationic and non-ionic surface active agents. They may be used alone or in mixtures of each surface active agent as well as the both. Cationic surface active agents are preferably used in combination with non-ionic surface active agents because of their lower emulsifying ability. The suitable non-ionic surface active agents include polyoxyethylene alkylethers, polyoxyethylene alkylphenylethers, sorbitan fatty acid esters, polyoxyethylene sorbitan fatty acid esters, polyoxyethylene amylesters, block copolymers of oxyethylene and oxypropylene, and the like. The suitable cationic surface active agents include alkyl amine salts, quaternary ammonium salts, polyoxyethylene alkyl amines, and the like. In the case of employing a cationic surface active agent, it is desirable that the reaction system is acidic. Thus, a Lewis acid is added in an amount of from 0.1 to 0.5 percent by weight based on the total charge. The Lewis acid includes aluminum trichloride, zinc dichloride, ferric chloride, titanium tetrachloride, tin chloride and the like. In the present process, it is characteristic that a stable latex can be obtained even in using a cationic surface active agent, which does not always act as an efficient surface active agent in an aqueous dispersion of the polymer. The amount of the emulsifier may vary over a wide range, depending on the species of the emulsifier used as well as the species of the monomers and the monomeric composition. Said amount can not be determined comprehensively, but determined specifically according to the desired latex to be obtained.

The polymerization initiators used in the emulsion according to the present invention may be any one of the conventional initiators for emulsion polymerization, including persulfates such as ammonium persulfates or alkaline metal persulfates, inorganic peroxides such as hydrogen peroxide, organic peroxides such as cumene hydroperoxide or paramenthane hydroperoxide and, redox system catalysts consisting of peroxides and reducing agents.

The starting aqueous composition containing monomers, surface active agents and polymerization initiators is activated by maintaining the mixture at a polymerization temperature determined according to the polymerization initiators used. If a very active polymerization initiator is used, polymerization reaction occurs even below room temperature. The polymerization reaction is conducted at a temperature ranging from −5° to 100°C, depending on the species of the polymerization initiators employed.

To the thus obtained aqueous dispersion of the copolymer containing units derived from the haloalkyl esters of acrylic or methacrylic acid, a basic nitrogen-containing containing compound should be added.

Said basic nitrogen-containing compound stands for a compound which reacts with the active halogen atom in the above-mentioned haloalkyl esters of acrylic or methacrylic acid, to form the ammonium salt thereof. The said compound defined above includes ammonia, primary amines, secondary amines and tertiary amines.

The examples of primary amines of the basic nitrogen-containing compounds are alkylamines such as methylamine, ethylamine, butylamine and the like. And as secondary amines, a dialkylamine such as dimethylamine, diethylamine, dibutylamine, methylethylamine, methylbutylamine or the like, and a heterocyclic compound containing nitrogen atom such as pyrrolidine, piperidine, morpholine or the like are exemplified.

The examples of the basic nitrogen-containing compounds which, in particular, form the quaternary ammonium salts thereof are such tertiary amines as trimethylamine, triethylamine, tributylamine, ethyldimethylamine, methyldiethylamine, trimethanolamine, triethanolamine, ethyldimethanolamine, N,N′-dimethylaniline, N,N′-dimethanolaniline and the like. In addition, there may be used pyridine, lutidine, quinoline, picoline and isoxazole. There may also be used such N-alkylated heterocyclic compounds containing nitrogen atom as N-alkyl derivatives of pyrrolidine, piperidine, morpholine and the like.

In the present invention an amount of the basic nitrogen-containing compound should be determined according to the concept 'the cation-formation ratio.' 'The cation-formation ratio' means a ratio of an amount employed of a basic nitrogen-containing compound to that of the halo-alkyl esters of acrylic or methacrylic acid. When the equivalent amount of the basic nitrogen-containing compound based on the haloalkyl esters of acrylic or methacrylic acid is used, the cation-formation ratio accounts to 100 percent. Accordingly, the said ratio of 50% means that the basic nitrogen-containing compound is used in the amount corresponding to one-half moles of the haloalkyl esters of acrylic or methacrylic acid employed. In the process of the present invention, the basic nitrogen-containing compound is preferably used in the amount corresponding to the cation-formation ratio of at least 75 percent. Though the cation-formation ratio is usually selected in the ranges of 75 to 100 percent, it may exceed 100 percent, if necessary.

The latex obtained above is treated with a basic nitrogen-containing compound, depending on both the polymer composition of the latex and the basic nitrogen-containing compound used, as shown in Table 1.

Table 1

| Sample No. | Polymer Composition (% by weight) | | | Cation-forming agent | Reaction temp. (°C) | Reaction time (hrs) |
|---|---|---|---|---|---|---|
| | Component 1 | Component 2 | Component 3 | | | |
| 1 | MMA[1] 50 | Butadiene 45 | 2-ClEMA[2] 5 | Trimethylamine | 80 | 18 |
| 2 | MMA[1] 50 | Butadiene 45 | 2-ClEMA[2] 5 | Triethylamine | 80 | 23 |
| 3 | MMA[1] 50 | Butadiene 45 | 2-ClEMA[2] 5 | Triethanolamine | 80 | 25 |
| 4 | MMA 50 | Butadiene 40 | 2-ClEMA 10 | Trimethylamine | 80 | 18 |
| 5 | MMA 45 | Butadiene 40 | 2-ClEMA 15 | Trimethylamine | 80 | 17 |

Table 1-continued

| Sample No. | Polymer Composition (% by weight) | | | Cation-forming agent | Reaction temp. (°C) | Reaction time (hrs) |
| --- | --- | --- | --- | --- | --- | --- |
| | Component 1 | Component 2 | Component 3 | | | |
| 6 | MMA 40 | Butadiene 40 | 2-ClEMA 20 | Trimethylamine | 80 | 16 |

Note:
[1]MMA = Methyl methacrylate
[2]2-ClEMA = 2-Chloroethyl methacrylate

The latex obtained according to the present invention shows a strongly cationic character. If electrophoresis is applied to the latex of the present invention, the particles rapidly migrate to cathode. This fact shows that the polymer particles in the latex are positively charged. It is also apparent from the adsorption property of the latex toward pulps or ion exchange resins that the particles in the latex are cationically charged. Table 2 shows the time required for the adsorption of various latices to an anionic ion-exchange resin (DIA ION SK-1B, trade mark of the product, produced by Mitsubishi Chemical Industries Ltd.).

Table 2

| Sample No. | (1) | (2) | (3) | (4) |
| --- | --- | --- | --- | --- |
| Adsorption time | 8 min. | 1 min. | 30 sec. | 10 sec. |

Note: The samples employed in Table 2 are as follows:
(1) A cationic latex which is prepared by treating the latex of MMA-butadiene-2-ClEMA ternary copolymer (2-ClEMA content: 5% by weight based on the total polymer) prepared using a nonionic surface active agent with trimethylamine (cation-formation ratio: 100%).
(2) A cationic latex which is prepared by treating the latex of the same ternary copolymer as (1) prepared using a cationic surface active agent instead of a nonionic surface active agent in (1) with trimethylamine (cation-formation ratio: 30%).
(3) The latex of (2) except that the cation-formation is 60%.
(4) The latex of (2) except that the cation-formation ratio is 100%.

The cationic latex obtained according to the process of the present invention is excellent in mechanical stability, freeze-thaw stability and chemical stability. Table 3 shows the mechanical stability, measured by a Maron's stability tester, and the freeze-thaw stability of the cationic latices of Sample No. 1 in Table 1 obtained according to the process of the present invention.

Table 3

| Cation-formation ratio | Coagulation ratio* in Maron's stability test | Freeze-thaw stability** |
| --- | --- | --- |
| 10% | 4.52% (by weight) | Once frozen, never recovered, to the original state after thawing. |
| 30% | 3.42% " | " |
| 60% | 1.37% " | Destabilized after twice repeated freezing-thawing cycles. |
| 75% | 0.54% " | Destabilized after 3 times repeated freezing-thawing cycles. |
| 85% | 0.0% " | Destabilized after 5 times repeated freezing-thawing cycles. |
| 100% | 0.0% " | " |

Note: Testing conditions:
*: 20 kg/cm², 1000 rpm, and 10 min.
**: frozen at −30°C, and thawed at 30°C.

The latex having the polymer composition of Sample No. 1 in Table 1 prior to the quaternary salt formation produces 4.9% by weight of deposited coagulation in the Maron's stability test under the conditions of 20 kg/cm², 1000 rpm and 10 min. If the said latex is frozen at −30°C, the similar dispersed state thereof cannot be recovered again. However, if the latex is treated with trimethylamine to form a quaternary ammonium salt to the cation-formation ratio of 100 percent, it produces no deposited coagulation under the same condition as above in the Maron's stability test. The dispersed state of the thus treated latex remained unaltered after five times repeated freezing (at −30°C) and thawing (at 30°C) cycles.

Further Table 4 shows the chemical property of the cationic latex corresponding to the latex of the Sample No. 1 in Table 2.

Table 4

| Additives | Latex of the present invention |
| --- | --- |
| Aqueous Solution of sodium chloride (saturated) | stable |
| Calcium dichloride (2 mol/l) | stable |
| Aluminum trichloride (2 mol/l) | stable |
| Sodium hydroxide (2 mol/l) | stable |
| Sodium sulfate (0.5 mol/l) | stable |
| Sodium phosphate (0.5 mol/l) | stable |

It is clear from these findings that the latex of the present invention is not influenced in any way by mono-, di- and trivalent metal ions and mono-, di- and trivalent anions, and that it possesses excellent chemical stability.

Examples are hereinafter described concretely.

EXAMPLE 1

55 Parts of water wherein 0.2 part of potassium persulfate and 5 parts of polyoxyethylene nonylphenyl ether were uniformly dissolved were charged into an autoclave equipped with a stirrer. After the entire atmosphere was replaced by nitrogen, 20 parts of styrene, 3 parts of 2-bromoethyl methacrylate and 22 parts of cooled butadiene were introduced to the autoclave. The mixture was heated up to 60°C and allowed to react for 15 hours, while stirring the mixture. A stable latex having a particle size of 0.2 μ and a pH of 4.5 was obtained.

100 Parts of said latex were charged into a reactor equipped with a stirrer and a condenser. Subsequently, 1.5 parts of triethylamine were then added to the reactor. The mixture was heated up to 80°C and allowed to react for about 23 hours. The resulting latex was a latex having positive charge and a pH value of 3.1. It was excellent in mechanical stability (none of the coagulated substance could be found by the test using Maron's stability tester under a condition of 20 kg/cm², 1000 rpm and 10 minutes) as well as in freeze-thaw stability (the dispersed state of the latex remained unaltered after 3 times repeated freezing-thawing cycles).

EXAMPLE 2

100 Parts of water wherein 0.1 part of potassium persulfate, 2 parts of trimethy hexadecyl ammonium chloride and 0.1 part of aluminum trichloride were uniformly dissolved were charged into an autoclave equipped with a stirrer. After the entire atmosphere was replaced by nitrogen, a uniformly blended mixture containing 30 parts of methyl methacrylate, 3 parts of 2-chloroethyl methacrylate, 22 parts of cooled butadiene and 0.2 part of n-lauryl mercaptan was introduced into the autoclave. Then the mixture was heated up to 60°C and allowed to react for about 15 hours. The latex obtained was a stable latex having a pH of 3.5 and a particle size of 0.1 micron. (This latex is hereinafter referred to as 'Latex A'.) 100 Parts of said Latex A were introduced into a reactor equipped with a stirrer and a reflux condenser. Adding 0.8 part of trimethylamine thereto, the mixture was heated up to 80°C and the reaction was continued for 18 hours. The product was a stable latex having strong positive charge and forming a quaternary ammonium salt thereof by the reaction with trimethylamine. This latex did not deposit in any way the coagulated substance in Maron's stability test (1,000 rpm, 20 kg/cm$^2$ kg/cm$^2$, 10 minutes), and the dispersed state of the latex was unaltered after 4 times repeated freezing-thawing cycles.

EXAMPLE 3

100 Parts of Latex A obtained in Example 2 were charged into a reactor equipped with a stirrer and a reflux condenser, and 1.8 parts of triethanolamine were added thereto. The mixture was then allowed to react at 80°C for about 25 hours. The 2-chloroethyl methacrylate in the copolymer formed a quarternary salt thereof, and imparted positive charge to the polymer particles. This cationic latex exhibited the same mechanical and freeze-thaw stabilities as those in Example 2.

EXAMPLE 4

100 Parts of 'Latex A' obtained in Example 2 were charged into a reactor equipped with a stirrer and a reflux condenser, and 1.0 part of pyridine were added thereto. The mixture was then allowed to react at 80°C for 20 hours. The 2-chloroethyl methacrylate units in the copolymer formed a salt thereof with pyridine, and thereby afforded a stable latex having strong positive charge. As the results of Maron's stability test (20 kg/cm$^2$, 1,000 rpm, 10 minutes), this latex did not deposit in any way the coagulated substance, and the dispersed state of the latex was unaltered after twice repeated freezing-thawing cycles.

EXAMPLE 5

100 Parts of water wherein 0.2 part of ammonium persulfate, 1 part of trimethyl hexadecyl ammonium chloride, 1 part of polyoxyethylene nonylphenyl ether and 0.1 part of aluminum trichloride were uniformly dissolved were charged in an autoclave equipped with a stirrer. After the entire atmosphere was replaced by nitrogen, a mixture containing 20 parts of butyl methacrylate, 20 parts of styrene and 10 parts of 2-chloroethyl methacrylate was added thereto. The reaction was conducted at 60°C for about 15 hours. The resulting latex was a stable latex having a pH of 4.0 and a particle size of 0.15 micron. Said latex was charged in a reactor equipped with a stirrer and a reflux condenser. 4.2 Parts of trimethylamine were added, and the reaction was conducted at 80°C for 15 hours. The resulting latex having strong positive charge was an excellent cationic latex having the freeze-thaw and mechanical stabilities similar to those in Example 2.

EXAMPLE 6

Example 5 was repeated using the same amount of vinyl monochloroacetate in place of 2-chloroethyl methacrylate. The reaction was conducted for about 18 hours. 5.0 Parts of trimethylamine were added to the latex obtained, and a cationic latex having strong positive charge was obtained. The freeze-thaw and mechanical stabilities of the latex were almost the same as those in Example 2.

The thus obtained cationic latex was forced to offer in an adsorption test onto a pulp slurry which was prepared by beating BKP-L Pulp to a Canadian Standard freeness of 250 ml and controlled in a concentration of ca. 5 percent by weight. 6 Milliliters of said cationic latex containing a non-volatile content of 30 percent by weight was added to 100 ml of the pulp slurry which was incorporated with 0.4 ml of a 2% aqueous sodium hydroxide solution to control the pH thereof. The cationic latex obtained in Example 5 was also subjected to the same adsorption test as mentioned above.

The pulp which adsorbed said latex was filtered, washed with a large amount of water and then dried. Results obtained are as follows:

| Run No. | Used Latex | Dry weight | Amount of polymer adsorbed | Adsorption ratio (Note) |
| --- | --- | --- | --- | --- |
| A | Blank test | 4.685 g | — | — |
| B | That of Example 6 (using vinyl chloroacetate) | 5.087 g | 0.402 g | ca. 22.3% |
| C | That of Example 5 (using 2-chloroethyl methacrylate) | 5.924 g | 1.239 g | ca. 68.7% |

Note: The ratio of the actual weight of adsorbed polymer to the theoretical weight of adsorbable polymer (about 1.8 grams).

As is clear from the above-mentioned table, the latex of Example 6 containing the units derived from vinyl chloroacetate could not favorably be adsorbed onto the pulp. There was observed that in the adsorption test of Run No. B the liquid comprising the latex of Example 6 and the pulp slurry did not become transparent, while the liquid of Run No. C became transparent after adsorption easily took place.

The difference as shown in the adsorption test results above-mentioned should be comprehended based on the following explanation: Vinyl esters including vinyl chloroacetate are not easily copolymerized with such comonomers as butyl methacrylate and styrene used in Example 6. Accordingly the dispersed particles in the latex of Example 6 may be composed of a mixture of polymers consisting essentially of a homopolymer of vinyl chloroacetate and a copolymer of butyl methacrylate with styrene, wherein the homopolymer of vinyl chloroacetate will be adsorbed on the surface of said copolymer. In the salt-forming procedure said vinyl chloroacetate homopolymer adsorbed on the surface of the dispersed particles should be transferred into the salt. On the other hand, in preparing the latex of Example 5, the copolymerization of the ternary monomers consisting of 2-chloroethyl methacrylate, butyl methacrylate and styrene is favorably conducted.

Although the latex of Example 6 had the same properties of the cationic latex as those of Example 2, it showed a favorable adsorption property onto the pulp due to the difference in the structure of the polymers which were the constituents of the particles dispersed in the latex.

EXAMPLE 7

After the entire atmosphere in an autoclave was replaced by nitrogen, 200 parts of water, 0.1 part of ferric sulfate, 0.3 part of cumene hydroperoxide, 0.6 part of glucose, 0.2 part of potassium dihydrogenphosphate, 1.2 parts of sodium hydrogenphosphate, 6 parts of polyoxyethylene nonylphenyl ether, 60 parts of methyl methacrylate, 34 parts of isoprene and 6 parts of 2-chloroethyl methacrylate were added thereto. While maintaining the temperature at 30°C, the reaction was conducted under stirring for 20 hours to complete the polymerization. The resulting latex was a stable latex having a pH of 7.2 and a particle size of 0.15 micron. Said latex was charged in a reactor equipped with a stirrer and a reflux condenser, and 3.8 parts of N-ethylpiperidine was added thereto. The reaction was carried out under stirring at 80°C for 18 hours. The latex produced was a stable latex containing the particles charged positively.

EXAMPLE 8

2.0 Parts of trimethyl hexadecyl ammonium chloride, 0.3 part of aluminum trichloride, 0.05 part of p-menthane hydroperoxide, 0.03 part of ferrous sulfate (7 $H_2O$), 0.08 part of sodium formaldehyde sulfoxylate, 0.04 part of tetrasodium ethylenediamine tetraacetate, 0.4 part of sodium phosphate (12 $H_2O$) and 0.2 part of n-lauryl mercaptan were dissolved in 80 parts of water. After the solution was introduced into an autoclave equipped with a stirrer, the entire atmosphere in the autoclave was replaced by nitrogen. Then, 2 parts of 2-iodoethyl acrylate, 40 parts of methyl methacrylate and 20 parts of cooled butadiene were introduced to the autoclave. The reaction was continued for 10 hours at about 10°C, while stirring the mixture. The resulting latex had a pH value of 4.5 and an average particle size of 0.08 micron.

Said latex was charged into another reactor equipped with a stirrer and a reflux condenser. 12 Parts of N-methyl morpholine were added, and the mixture was heated up to 80°C and the reaction was continued for 20 hours. The product was a stable cationic latex, and no coagulated substance was deposited in Maron's stability test.

EXAMPLE 9

Into an autoclave equipped with a stirrer were introduced 150 parts of an aqueous solution wherein 5 parts of polyoxyethyleneglycol sorbitan monolaurate, 0.3 part of sodium lauryl benzene sulfonate and 0.2 part of potassium persulfate were uniformly dissolved. After the entire atmosphere of the reaction system was replaced by nitrogen, 10 parts of 6-bromo-2-ethyl hexyl acrylate, 60 parts of ethyl acrylate and 30 parts of lauryl methacrylate were charged thereto. Polymerization was conducted at 70°C for 10 hours. The product obtained was a stable latex having a pH of 6.6 and an average particle size of 0.18 micron.

Said latex was introduced into another autoclave equipped with a stirrer and a condenser. By adding thereto 1.7 parts of trimethylamine, a cation-forming reaction was carried out at 70°C for about 30 hours. The cationic latex obtained exhibited the same mechanical and freeze-thaw stabilities as those in Example 2.

What we claim is:

1. A process for producing a cationic synthetic latex, wherein copolymer particles have cationic charges in themselves and are dispersed in an aqueous medium, which comprises:
    1. copolymerizing by emulsion polymerization a haloalkyl ester of acrylic or methacrylic acid of the formula:

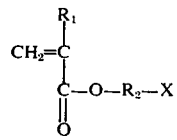

1. wherein $R_1$ is a hydrogen atom or a methyl group; $R_2$ represents a linear or branched alkylene group having 1 to 12 carbon atoms; and X represents a chlorine, bromine or iodine atom, with at least one comonomer selected from the group consisting of styrene, alkyl esters of acrylic or methacrylic acid, vinyl chloride, vinylidene chloride and conjugated diene compounds, the amount of said haloalkyl ester being 1 to 40 percent by weight and the amount of said comonomer being 60 to 99 percent by weight based on the entire amount of the monomeric composition, in the presence of at least one emulsifier selected from the group consisting of nonionic and cationic surface active agents by use of a conventional emulsion polymerization initiator at a temperature of −5° to 100°C, and then
    2. adding to the aqueous dispersion of said copolymer at least one basic nitrogen-containing compound selected from the group consisting of ammonia, primary amines, secondary amines and tertiary amines to form an ammonium salt of said copolymer, said basic nitrogen-containing compound being used in such an amount that the cation-formation ratio based on the amount of the haloalkyl ester of acrylic or methacrylic acid becomes at least 75 percent.

2. A process according to claim 1, wherein said haloalkyl ester of acrylic or methacrylic acid is selected from the group consisting of 2-chloroethyl acrylate, 2-chloroethyl methacrylate and 2-bromoethyl methacrylate.

3. A process according to claim 1, wherein the basic nitrogen-containing compound is at least one tertiary amine selected from the group consisting of trialkylamines and N-alkylated derivatives of heterocyclic compounds containing nitrogen or nitrogen and oxygen as the sole heterocyclic atoms.

4. A process according to claim 1, wherein the cationic surface active agent is contained as one member of said emulsifier.

5. A process according to claim 1 wherein said haloalkyl ester is copolymerized with said conjugated diene and styrene.

6. A process according to claim 1 wherein said haloalkyl ester is copolymerized with said conjugated diene and said alkyl ester of acrylic or methacrylic acid.

7. A process according to claim 5 wherein said conjugated diene is isoprene or butadiene.

8. A process according to claim 6 wherein said conjugated diene is isoprene or butadiene.

9. A process according to claim 1 wherein the amount of said haloalkyl ester is from 3 to 20 percent by weight and wherein the amount of said comonomer is from 80 to 97 percent by weight, based on the weight of the entire amount of monomers.

10. A process according to claim 1 wherein said emulsifier is a cationic surface-active agent and wherein said copolymerization is conducted in the presence from 0.1 to 0.5 percent by weight, based on the total emulsion polymerization system, of a Lewis acid.

11. A process according to claim 10 wherein said Lewis acid is selected from the group consisting of aluminum trichloride, zinc dichloride, ferric chloride, titanium tetrachloride and tin chloride.

12. A process according to claim 1 wherein the monomers subjected to said emulsion polymerization consist essentially of said haloalkyl ester, said conjugated diene, and said styrene.

13. A process according to claim 1 wherein the monomers subjected to said emulsion polymerization consist essentially of said haloalkyl ester, said conjugated diene and said alkyl ester of acrylic or methacrylic acid.

* * * * *

UNITED STATES PATENT OFFICE
CERTIFICATE OF CORRECTION

Patent No. 3,926,890    Dated December 16, 1975

Inventor(s) CHING YUN HUANG, ET AL

It is certified that error appears in the above-identified patent and that said Letters Patent are hereby corrected as shown below:

Title Page - Please insert the following:

--[30] Foreign Application Priority Data

May 20, 1970 Japan ..................42386--

Column 1, line 14, "a aqueous" should read --an aqueous--

Column 1, line 60, "gencontaining" should read

--gen-containing--

Column 3, lines 42-43 "emulsion according" should read

--emulsion polymerization according--

Signed and Sealed this

Sixth Day of July 1976

[SEAL]

Attest:

RUTH C. MASON
Attesting Officer

C. MARSHALL DANN
Commissioner of Patents and Trademarks